United States Patent [19]
Antkowiak

[11] Patent Number: 5,842,242
[45] Date of Patent: Dec. 1, 1998

[54] METHOD FOR INCREASING THE CONSISTENCY OF PULP USING A SINGLE ROLL DISPLACMENT WASH PRESS

[75] Inventor: John S. Antkowiak, New Boston, N.H.

[73] Assignee: Beloit Technologies, Inc., Wilmington, Del.

[21] Appl. No.: 968,295

[22] Filed: Nov. 12, 1997

Related U.S. Application Data

[62] Division of Ser. No. 689,184, Aug. 5, 1996, Pat. No. 5,722,264.

[60] Provisional application No. 60/001,946 Aug. 7, 1995.

[51] Int. Cl.⁶ .................................................... D21C 1/02
[52] U.S. Cl. ............................................................... 8/156
[58] Field of Search ........................... 8/156; 68/43, 158, 68/181 R; 100/121; 162/60, 317, 328, 329, 380; 210/402, 404, 408, 409, 784

[56] References Cited

U.S. PATENT DOCUMENTS

| | | |
|---|---|---|
| 2,057,059 | 10/1936 | Rue . |
| 2,988,470 | 6/1961 | Bradway et al. . |
| 2,999,785 | 9/1961 | Richter et al. ............................. 162/60 |
| 3,772,144 | 11/1973 | Luthi et al. . |
| 3,959,068 | 5/1976 | McIlroy et al. . |
| 4,039,372 | 8/1977 | Reeve et al. . |
| 4,217,170 | 8/1980 | Luthi . |
| 4,266,413 | 5/1981 | Yli-Vakkuri . |
| 4,273,612 | 6/1981 | Hillstrom et al. . |
| 4,472,242 | 9/1984 | Osawa et al. . |
| 4,827,741 | 5/1989 | Luthi . |
| 5,046,338 | 9/1991 | Luthi . |

FOREIGN PATENT DOCUMENTS

| | | |
|---|---|---|
| 92-22702 | 12/1992 | WIPO . |

OTHER PUBLICATIONS

Luthi copending and commonly assigned U.S. Patent application having Serial No. 08/598,410, filed Feb. 8, 1996, entitled "A Pulp Slurry–Handling Press Roll, and Twin Roll and Single Roll Slurry–Handling Presses", in its entirety.

Beloit Belpond Washer Operator Manual prepared by Beloit Corporation, Beloit, Wisconsin for Potlatch Corporation, Lewistown, ID, as illustrated in Figs. 3.1.1 through 3.1.11 circa 1992 or earlier.

Kamyr Bulletin, Karlstad Sweden, entitled "Wash Press", dated Feb. 10, 1986, pp. 1–21 (numbers handwritten).

*Primary Examiner*—Philip R. Coe
*Attorney, Agent, or Firm*—Hill & Simpson

[57] ABSTRACT

A single roll wash press comprising a housing and a drum rotatably mounted within the housing. The drum includes a perforated outer wall and a longitudinally extending centerline axis and is rotatable about the axis. The press further comprises a means for receiving a flow of pulp having an initial consistency ranging from about 2% o.d. to about 6% o.d. such that the pulp flows in the direction of drum rotation, and a means for defining a divergent formation zone and for forming a mat of the pulp on the drum within the divergent formation zone. The means for defining and forming comprises a first arcuate portion of the housing with the formation zone being divergent between upstream and downstream ends thereof. The upstream end of the divergent formation zone communicates with the means for receiving the flow of the pulp. The press further includes a means for washing the pulp mat within a displacement zone disposed downstream of the extraction zone. The press may further include a means for increasing the consistency of the pulp within an extraction zone disposed circumferentially between the formation and displacement zones.

13 Claims, 2 Drawing Sheets

METHOD FOR INCREASING THE CONSISTENCY OF PULP USING A SINGLE ROLL DISPLACMENT WASH PRESS

CROSS-REFERENCES

This is a divisional of application Ser. No. 08/689,184, filed Aug. 5, 1996, and now U.S. Pat. No. 5,722,264.

The subject application claims the priority benefits of U.S. Provisional patent application having Ser. No. 60/001,946 filed on Aug. 7, 1995, entitled: "Single Roll Displacement Wash Press".

BACKGROUND OF THE INVENTION

1.0. Field of the Invention

The present invention relates generally to the washing of lignocellulosic materials, such as wood pulp, for use in the pulp and paper industry, and more particularly to a single roll displacement wash press.

2.0. Related Art

Washing of lignocellulosic materials such as wood pulp is well known in the art. The washing of pulp is typically accomplished by a combination of two mechanisms: dilution-extraction; and displacement. Displacement washing typically is more efficient than dilution-extraction washing, since less wash medium is required to accomplish the same degree of pulp cleanliness. Although displacement washing has been widely used in the pulp and paper industry, it is subject to the following limitations. Effective displacement washing requires that the pulp fiber mat that is to be washed is of uniform density and free from discontinuities. If the pulp mat does not have these characteristics, the washing medium may be channeled through the pulp mat, thereby defeating the purpose of displacing undesirable contaminated liquor with relatively clean wash medium. Additionally, the fiber mat to be washed must be resilient so as to maintain the qualities of uniform density and lack of discontinuity as the wash medium is applied.

Known pressure rotary drum washers and presses typically form a fiber mat on a perforated drum surface by feeding pulp having a consistency ranging from about 3% o.d. to about 6% o.d. to a formation zone. In all pressure-type rotary drum washers and presses having a wash pond, which are known to the inventor, the formation zone converges in the direction of flow of the pulp through the formation zone. As the pulp stock progresses through the convergent formation zone, the pulp mat is formed and dewatered through perforations in the drum to a higher consistency. A relatively high differential pressure between the formation zone and the interior of the drum is required for the rapid dewatering of the pulp mat to occur. The resulting pulp mat is then discharged to a wash zone containing the wash medium. The wash zone is necessarily at a lower pressure than the formation zone so that the pulp may exit the formation zone and to prevent the wash medium from entering the formation zone. The rapid pressure drop that the pulp mat experiences causes disruption of the mat. Some of the pulp may be so violently disrupted that it liberates from the mat and mixes freely with the wash medium. The resulting discontinuities in the pulp mat and the mixing of a portion of the pulp mat with the wash medium prevents full exploitation of the displacement process. Additionally, in known pond-type pressure washers and presses, the wash liquid must be introduced into the displacement zone at a relatively high velocity in order to achieve effective distribution of the wash liquid. The wash liquid inlet is typically located immediately following the formation zone where the high turbulence of the wash liquid further disrupts the pulp mat and decreases the efficiency of the displacement process.

Known wash presses typically employ two drum surfaces which rotate with one another to form a pressing nip. A pulp mat is formed and washed, as described previously, on the surfaces of one or both of the drums. In all wash devices which achieve a high final discharge consistency of the pulp, the wash liquor is applied while the pulp fiber mat is at an intermediate consistency, typically ranging from about 9–18% o.d., in order to achieve practical wash liquor supply pressures. Consequently, due to the relatively high volume of liquid in the medium consistency pulp and the requirement to maintain a system flow balance between the liquid supplied to and extracted from the wash device, the amount of wash liquor applied is typically insufficient to fully displace the contaminated liquor contained in the mat formed from the medium consistency pulp. This problem is exacerbated in the case of twin roll presses, where the partially washed pulp mat is fed into a nip formed by two rolls and pressed to a high consistency. The rate of convergence at the nip is so great that extremely rapid dewatering must take place requiring extremely high pressures. The pulp mat typically cannot withstand the high pressures and micro-disruptions in the pulp fiber matrix form which permits the wash liquor to flow through the pulp mat in an undesirable, random manner. Uniform dewatering cannot take place in this environment and the boundary between the wash liquor and the contaminated liquor in the pulp is not maintained, thereby eliminating the possibility of continuing displacement washing during the extraction dewatering process at the nip which reduces overall washing efficiency.

Additionally, with known pressure washers the pulp mat passes through at least one converging area which may be created by a dewatering baffle, press roll, or similar device prior to being discharged from the washer. In the case of washers which include a dewatering press roll or similar device which is substantially non-retractable, it is virtually impossible to purge any pulp plug which may be formed in the machine. In the case of washers having a substantially retractable baffle, the baffle discharge is typically substantially displaced from the final discharge area of the washer such that any plug which may be liberated from the baffle is required to travel upward in the washer against the action of gravity while passing other washer components that may tend to trap the plug before it may be purged from the washer.

The foregoing illustrates limitations known to exist in present wood pulp washers. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a single roll displacement wash press, comprising:
 a housing;
 a drum rotatably mounted within housing, the drum including a longitudinally extending centerline axis, a generally cylindrical outer wall having an outer surface and an inner surface, wherein the outer wall is perforated and the drum is rotatable about the centerline axis;

a means for receiving a flow of pulp having a consistency ranging from about 2% o.d. to about 6% o.d. such that the pulp flows in the direction of rotation of the drum;

a means for defining a divergent formation zone and for forming a mat of the pulp on the drum within the divergent formation zone, the means for defining and forming comprising a first arcuate portion of the housing, wherein the divergent formation zone is divergent between an upstream end thereof and a downstream end thereof, the upstream end of the divergent formation zone communicating with the means for receiving the flow of the pulp;

a means for washing the pulp mat within a displacement zone, the displacement zone being disposed downstream of the divergent formation zone.

In a second aspect of the present invention, this is accomplished by a method for increasing a consistency of pulp using a single roll displacement wash press having a housing and a drum rotatably mounted within the housing, with the press further including in circumferential succession, a formation zone, an extraction zone, and a displacement zone, and with the method comprising the steps of:

supplying a pulp having a consistency ranging from about 2% o.d. to about 6% o.d. to the formation zone of the single roll displacement wash press;

forming a mat of the pulp on a generally cylindrical outer surface of the drum within the formation zone of the press;

supplying a gaseous medium to the extraction zone so as to pressurize the extraction zone and gently force contaminated liquor out of the pulp mat so as to increase the consistency of the pulp within the extraction zone;

washing the pulp mat within the displacement zone of the press;

removing the pulp mat from the drum.

BRIEF DESCRIPTION OF THE DRAWINGS

The foregoing and other aspects of the present invention will become more apparent from the subsequent Detailed Description when considered in conjunction with the accompanying drawings, wherein.

DETAILED DESCRIPTION

Figure 1:
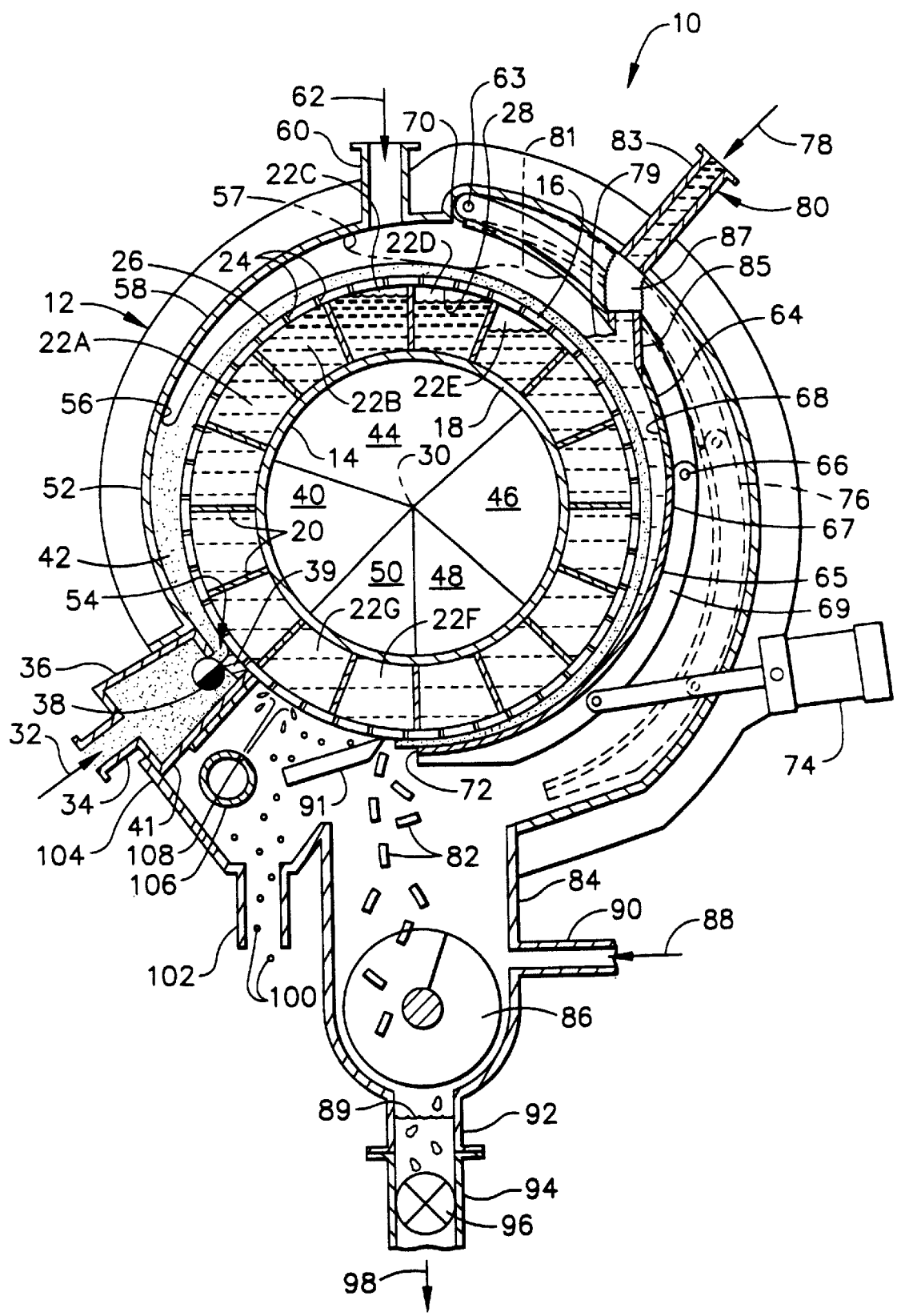
FIG. 1 illustrates a single roll displacement wash press according to a first embodiment of the present invention.

Referring now to the drawings, FIG. 1 illustrates a single roll displacement wash press 10, according to a first embodiment of the present invention. The wash press 10 is effective for washing lignocellulosic materials, such as wood pulp. As known in the art, wood pulp is obtained from the digestion of wood chips, from repulping of recycled paper, or from other sources and is commonly processed in pulp and paper mills in slurry form in water. As used herein, the term "consistency" is used to express the measured ratio of dry pulp fibers to water, or more specifically, the weight of dry pulp fibers in a given weight of pulp slurry or "pulp stock" as a percentage. Various definitions are used, such as air-dry consistency (a.d. %) or oven-dry consistency (o.d. %), or moisture-free consistency (m.f. %). The laboratory techniques for measuring these values can be found in references well known in the art, such as the TAPPI Standards Manual.

Terms widely used to describe ranges of stock consistency useful in pulp and paper plants follow:
Low Consistency—below about 4–6% o.d.
Medium Consistency—about 9–18% o.d.
High Consistency—above about 18–20% o.d., but more commonly above about 25% o.d.

The single roll displacement wash press 10 includes a housing 12 and a perforated drum 14 which is rotatably mounted with housing 12. The drum 14 includes a generally cylindrical outer wall 16 and a generally cylindrical inner wall 18 which is radially spaced from and inward of the outer wall 16. Drum 14 further includes a plurality of circumferentially spaced struts 20 which define, or form a plurality of circumferentially spaced filtration chambers 22 between the outer wall 16 and the inner wall 18 of drum 14. Filtration chambers 22 extend substantially throughout the longitudinal length of drum 14 and are effective for draining contaminated liquor from drum 14 as subsequently described in further detail. Drum 14 further includes a plurality of generally radially extending filtration holes 24 which extend through the outer wall 16 of drum 14. Each of the holes 24 extends between a generally cylindrical outer surface 26 of outer wall 16 and a generally cylindrical inner surface 28 of outer wall 16 and communicates with one of the filtration chambers 22. Drum 14 further includes a longitudinally extending centerline axis 30 and is rotatable about axis 30. In the illustrated embodiment shown in FIG. 1, drum 14 rotates in a clockwise direction about axis 30.

A flow of a pulp 32 having a consistency ranging from about 2% o.d. to about 6% o.d., is supplied to a pulp inlet 34 of the housing 12 of press 10. The low consistency pulp 32 includes a relatively high volume of contaminants due to upstream processing within the associated pulp plant. The removal of these contaminants is accomplished by the wash press 10 of the present invention as subsequently described in further detail. The low consistency pulp 32 supplied to inlet 34 then flows to a pulp slurry inlet box 36 which extends substantially throughout the longitudinal length of wash press 10. A bar-type slice valve 38 is rotatably mounted within the pulp slurry inlet box 36. When valve 38 is in the open position illustrated in FIG. 1, the pulp slurry inlet box 36 communicates with a formation zone 40 of press 10, so that the low consistency pulp 32 discharges from box 36 through valve 38 (the portion not shaded in FIG. 1) and into the formation zone 40. The pulp slurry, or low consistency pulp 32 then immediately follows the rotation of the drum 14 which is in a clockwise direction in the illustrative embodiment shown in FIG. 1. The flow of the pulp 32 within housing 12 in the direction of the rotation of drum 14 is facilitated by a flow deflector 39 which is attached to a member 41 of inlet box 36 which extends substantially throughout the longitudinal length of wash press 10. Due to the rotation of drum 14, a pulp mat 42 is formed on the outer surface 26 of the outer wall 16 of drum 14. The pulp mat 42 is then exposed, in succession, to an extraction zone 44, a displacement zone 46, a compaction zone 48, and a face cleaning and take-off zone 50 of press 10, within housing 12, due to the rotation of drum 14. The circumferential boundaries of each of the zones 40, 44, 46, 48, and 50 are schematically indicated generally by a pair of outwardly extending radial lines emanating from axis 30 of drum 14 as shown in FIG. 1.

The outer boundary of the formation zone 40 is formed, or defined by a first arcuate portion 52 of housing 12 with the pulp mat 42 being formed on the outer surface 26 of the outer wall 16 of drum 14. The pulp mat 42 extends radially between the outer surface 26 and the arcuate portion 52 of housing 12, within the formation zone 40. The formation zone 40 extends circumferentially between an upstream end 54, which corresponds to the location at which the pulp 32 is initially applied to drum 14, and a downstream end 56 which corresponds to the location where the pulp mat 42 pulls away from portion 52 of housing 12. The low consistency pulp 32 is supplied to the pulp inlet 34 of housing 12, and then to the formation zone 40, from a conventional pump (not shown). The pump establishes a hydraulic pressure of the low consistency pulp 32 within the formation zone 40 which gradually forces the contaminated liquor out of the pulp mat 42, through holes 24 formed in the outer wall 16 of drum 14, and into the individual ones of the filtration chambers 22 which are aligned with the formation zone 40. Each of the filtration chambers 22 are sealed at one longitudinal end (not shown) of press 10 and are open to atmosphere at the opposite longitudinal end (not shown), thereby permitting the contaminated liquor entering filtration chambers 22 to drain out of press 10. Additionally, the difference between the hydraulic pressure of the pulp within the formation zone 40 and the atmospheric pressure within the filtration chambers 22 provides the necessary force to dewater the pulp mat 42 as it passes through formation zone 40. Accordingly, the consistency of the pulp within the pulp mat 42 is gradually increased as the pulp mat 42 travels circumferentially through formation zone 40. As shown in FIG. 1, the formation zone 40 is divergent between the upstream end 54 and the circumferentially spaced downstream end 56. The fact that the formation zone 40 is divergent, distinguishes formation zone 40 over the formation zones of conventional pressure-type pulp washers known to the inventor, which include convergent formation zones. Due to the gradual increase in consistency of the pulp as the pulp mat 42 passes through the divergent formation zone 40, the space required to contain the pulp mat 42 is decreased. Accordingly, the pulp mat 42 breaks away from the arcuate portion 52 of housing 12 at the downstream end 56 of the divergent formation zone 40 as shown in FIG. 1. The circumferential location of the downstream end 56 of zone 40 may vary with the production feed rate of the low consistency pulp 32 as subsequently discussed in greater detail.

After passing through the formation zone 40, the pulp mat 42 enters the extraction zone 44 which extends circumferentially between the formation zone 40 and the displacement zone 46, where a wash medium is applied to the pulp mat 42 as subsequently discussed in greater detail. The radially outer boundary of the extraction zone 44 is defined at an upstream end of extraction zone 44 by the first arcuate portion 52 of housing 12 and is defined throughout the remainder of extraction zone 44 by a second portion 58 of housing 12 which is connected to the first portion 52 of housing 12. Portions 52 and 58 of housing 12 blend smoothly with one another and may comprise a unitary construction. Wash press 10 further includes a gas inlet 60 which communicates with the extraction zone 44. A gas 62, preferably comprising air, is supplied from a conventional blower (not shown) through the gas inlet 60 and into extraction zone 44 so as to pressurize the portion of zone 44 which exists between the pulp mat 42 and the portion 58 of housing 12 which is radially spaced from pulp mat 42. The extraction zone 44 is disposed circumferentially on either side of the top center of housing 12 and the pressure of the air 62 entering zone 44 as well as the effects of gravity combine to hold the pulp mat 42 against the drum 14 throughout the extraction zone 44. The pressurized air 62 creates a pressure differential across the mat 42 since the filtration chambers 22 are exposed to atmospheric pressure as discussed previously. The pressure of air 62 gently forces contaminated liquor out of the pulp mat 42, through holes 24 and into the individual ones of filtration chambers 22 which are aligned with the extraction zone 44, for any given instant in time, with these chambers being denoted 22A–22E in FIG. 1. Removal of contaminated liquor from the pulp mat occurs gradually throughout the extraction zone 44. As shown in FIG. 1, filtration chambers 22A and 22B are substantially filled with contaminated liquor which has been forced out of the mat 42. In contrast, filtration chambers 22C, 22D, and 22E are partially filled with contaminated liquor and each contains a gas space, which reflects an amount of air which has passed through the pulp mat 42 as the pulp mat 42 travels clockwise through extraction zone 44. The pulp within pulp mat 42 reaches a terminal consistency which may be as high as about 15% o.d. prior to the pulp entering the displacement zone 46. Consequently, the contaminated liquor displaced into chambers 22A–22E may be drained from drum 14 prior to these chambers rotating into the displacement zone 46, thereby providing effective separation of the subsequently described wash medium and the extracted, contaminated liquor. The terminal consistency of the pulp as the pulp mat 42 discharges from extraction zone 44 is achieved without disrupting the pulp mat 42 and accordingly, this consistency is achieved while maintaining the desired uniformity and integrity of pulp mat 42.

After discharging from the extraction zone 44, the pulp mat 42 enters the displacement zone 46 where efficient displacement washing takes place. The displacement zone 46 extends circumferentially between the extraction zone 44 and the compaction zone 48. Wash press 10 further includes a baffle 64 which is pivotally attached to housing 12 by an upper pin 63 and a lower pin 66. Baffle 64 is disposed within housing 12 and includes a circumferentially and longitudinally extending portion 65, having a radially outer surface 67 and a radially inner surface 68, and a circumferentially and radially extending rib 69 attached to portion 65. The radially inner surface 68 of portion 65 comprises a radially inner surface of baffle 64 and forms a radially outer boundary of the displacement zone 46. As shown in FIG. 1, baffle 64 converges relative to drum 14, between an upstream end 70 of baffle 64 and a downstream end 72 of baffle 64. A pneumatically actuated piston 74 is attached to the rib 69 of baffle 64 proximate the downstream end 72 of baffle 64, and is effective for pivoting baffle 64 between an operating position shown in solid in FIG. 1 and a retracted, fully divergent, pulp-plug-purging position indicated generally at 76 with dashed lines in FIG. 1. The fully divergent position 76 of baffle 64 may be achieved since both the portion 65 and the rib 69 of baffle 64 include separate upper and lower portions which extend above and below, respectively, the lower pin 66. The radially inner surface 68 of baffle 64 is radially spaced from the outer surface 26 of the outer wall 16 of drum 14 throughout the displacement zone 46. The area created by this spacing of the inner surface 68 of baffle 64 from drum 14 is at least partially flooded with a wash liquid 78 which is supplied to the displacement zone 46 via a wash liquid inlet 80 which communicates with the displacement zone 46. In the illustrative embodiment shown in FIG. 1, inlet 80 includes an outer portion 83 which is attached to housing 12, an inner portion 85 attached to baffle 64 and moveable therewith, and a flexible portion 87 disposed between and attached to the outer portion 83 and the inner portion 85. Wash liquid 78 has a liquid level 79 which indicates the extent to which the space between surface 68 of baffle 64 and drum 14 is flooded with the wash liquid 78 for typical production flow rates of pulp 32 and wash liquid 78. However, the level of liquid 78 may vary with these production flow rates as subsequently discussed in greater detail. The beginning, or upstream end of the displacement zone 46 corresponds to the location where the wash liquid 78 contacts the pulp mat 42, indicated by liquid level 79, and the downstream end of displacement zone 46 corresponds to the location where baffle 64 initially contacts the pulp mat 42. The wash liquid 78 may comprise substantially clean water or may alternatively comprise filtrate from a succeeding washer 10, when a plurality of washers 10 are used in a series flow configuration. As yet another alternative, the wash liquid 78 may comprise filtrate from a succeeding stage of the associated pulp plant. The combination of the static head of the wash liquid 78 and the pressure of the air 62 supplied to the extraction zone 44 combine to force the wash liquid 78 through the pulp mat 42 so as to displace contaminated liquor from the pulp mat 42. The use of piston 74 to load baffle 64 provides a controllable force which can be applied to the pulp mat 42 which permits the discharge consistency of the pulp within pulp mat 42 to be controlled independently of process variations. The discharge consistency of the pulp can be controlled in this manner to suit the system requirement through a range of medium to high consistency. The displaced, contaminated liquor flows through holes 24 and into the filtration chambers 22 which are aligned with the displacement zone 46. The contaminated liquor then discharges out of the open longitudinal end of press 10.

After passing through the displacement zone 46, the pulp mat 42 rotates into the compaction zone 48. The upstream end of compaction zone 48 is defined by the location where baffle 64 initially contacts the pulp mat 42 and the downstream end of compaction zone 48 is defined by the location where the pulp mat 42 discharges from the downstream end 72 of baffle 64. The radially inner surface 68 of baffle 64 is in contacting engagement with the pulp mat 42 throughout the compaction zone 48. Accordingly, a mechanical force is applied to the pulp mat 42 which displaces an additionally quantity of contaminated liquor from the pulp mat 42, with the magnitude of the applied mechanical force increasing in a clockwise direction due to the convergent relationship between baffle 64 and drum 14. The convergence rate of the baffle 64 relative to drum 14 is gradual so that the portion of the wash liquid 78 absorbed by the pulp mat 42 in a stratified manner is uniformly drawn through the pulp mat 42 maintaining the displacement process throughout the compaction zone 48. If a pulp plug forms within the compaction zone 48, baffle 64 can be retracted to the fully divergent position indicated at 76. Since the pulp mat 42 is removed from drum 14 after it discharges from the downstream end 72 of baffle 64, as subsequently discussed in further detail, there are no additional elements of press 10 which can impede the purging action of any pulp plug which is formed. Furthermore, due to the positioning of baffle 64 the purging of any pulp plug which is formed is facilitated by the action of gravity and the static pressure head of the wash liquor 78.

As discussed previously, the extraction zone 44 extends circumferentially between the formation zone 40 and the displacement zone 46. Accordingly, the arc length of the extraction zone 44 is determined by the circumferential spacing between the downstream end of the formation zone 40 and the upstream end of the displacement zone 46. It may be appreciated that as the feed rate of the low consistency pulp 32 supplied to the pulp inlet 34 of housing 12 is increased, and the corresponding feed rate of the wash liquor 78 is increased proportionally, that the arc length of both the formation zone 40 and the displacement zone 46 will necessarily increase. Since the pulp inlet 34 and the downstream end 72 of baffle 64 are at fixed locations in press 10, the arc length of the extraction zone 44 is foreshortened by an amount corresponding to the combined increase in the arc lengths of the formation zone 40 and the displacement zone 46. This phenomenon can continue until the formation zone 40 meets the displacement 46, such that the extraction zone 44 is eliminated. In this instance, the interface between the formation zone 40 and the displacement zone 46 occurs within an upper portion of housing 12, where a tangent to the outer surface 26 of the outer wall 16 of drum 14 is substantially horizontal. In this mode of operation, the wash liquid 78 has a liquid level 81 indicated in dashed lines, which extends between the pulp mat 42 and the inner surface 68 of baffle 64. Furthermore, the pulp mat 42 breaks away from housing 12 at approximately this location, which is indicated generally at 57 shown in dashed lines. Since the interface between the formation zone 40 and the displacement zone 46 occurs within an upper portion of housing 12 in this instance, the effects of gravity assist in maintaining the integrity of the pulp mat 42 at the location of initial contact with the wash liquid 78, as indicated by liquid level 81. Furthermore, the circumferential location of the wash liquid inlet 80 is below the liquid level 81 when the arc length of extraction zone 44 is sufficiently foreshortened, or is nonexistent, due to the increase in the arc lengths of the formation zone 40 and the displacement zone 46. As the upstream end of the displacement zone 46 moves counterclockwise the liquid level of wash liquid 78 also moves counterclockwise which is indicated by the difference in locations of liquid levels 79 and 81 shown in FIG. 1. As this occurs, the radial clearance between the inner surface 68 of baffle 64 and the pulp mat 42 increases. The combination of this increasing clearance between surface 68 and pulp mat 42 and the location of wash liquid inlet 80 relative to liquid level 81, allows any turbulence of the wash liquid 78 to dampen out, thereby eliminating the potential of the wash liquid 78 to disrupt the pulp mat 42. Additionally, this mode of operation eliminates air entrainment which may be otherwise introduced into the pulp mat 42 within the extraction zone 44, thereby maintaining the uniformity of the pulp mat 42. The foregoing features of press 10 enable a wide range of production rates without compromising operability or efficiency.

After the pulp mat has discharged baffle 64, the pulp mat is mechanically doctored, or removed from drum 14 by a doctor blade 91 which is attached to housing 12 and disposed within the face-cleaning and take-off zone 50. The tip of the doctor blade 91 is spaced in close proximity to the outer surface 26 of the outer wall 16 of drum 14. Blade 80 is effective for breaking the pulp mat 42 into small pieces, indicated generally at 82 which fall into a pressurized repulper, or outlet chute 84. A helical screw 86 is rotatably mounted within the outlet chute 84 and is used to discharge the pulp from chute 84. A dilution liquid 88, which may comprise water or a variety of wash filtrates, is supplied to chute 84 via dilution liquid inlet 90. Dilution liquid 88 is used to achieve the desired pulp consistency which is consistent with requirements of the downstream process. The pulp discharges out of chute 84 through a chute outlet port 92, conduit 94 and valve 96 which is disposed within conduit 94. The pulp may then be supplied to a downstream process as indicated by flow arrow 98. The level 89 of the diluted, washed pulp stock within chute 84 may be controlled to a desired height by opening valve 96 to a predetermined position.

Although the doctor blade 91 removes a substantial portion of the pulp mat 42 from drum 14, small particles of pulp, indicated generally at 100 pass through the small clearance formed between the tip of the doctor blade 91 and drum 14 and then drop through a discharge port 102 of a crumb sluice box 104. A spray manifold 106, having at least one spray nozzle 108 is disposed within the crumb sluice box 104. A wash liquid flowing through the hollow interior of the manifold 106 is directed onto the outer surface 26 of the outer wall 16 of drum 14 by nozzle 108 so as to clean the surface 26 within the face-cleaning and take-off zone 50 of press 10. The face-cleaning and take-off zone 50 begins as the pulp mat 42 discharges from the downstream end 72 of baffle 64 and ends at the upstream end of the formation zone 40. Contaminated filtrate, or liquor, contained within the individual filtration chambers 22 which are aligned with the face-cleaning and take-off zone 50 for any given instant in time, with these chambers being denoted as 22F and 22G in FIG. 1, will begin to flow outward through the holes 24 which communicate with chambers 22F and 22G and extend through the outer wall 16 of drum 14, under the action of gravity and centrifugal forces. The contaminated filtrate is substantially prevented from contacting the washed pulp 82 by the doctor blade 91 and is directed into the crumb sluice box 104 and out of the press 10 through the discharge port 102. Due to the rotational speed of the drum 14, and the relatively small circumferential spacing between the downstream end 72 of the baffle 64 and the tip of the doctor blade 91, re-wetting of the washed pulp 82 by the contaminated filtrate within chambers 22F is insignificant.

Figure 2:
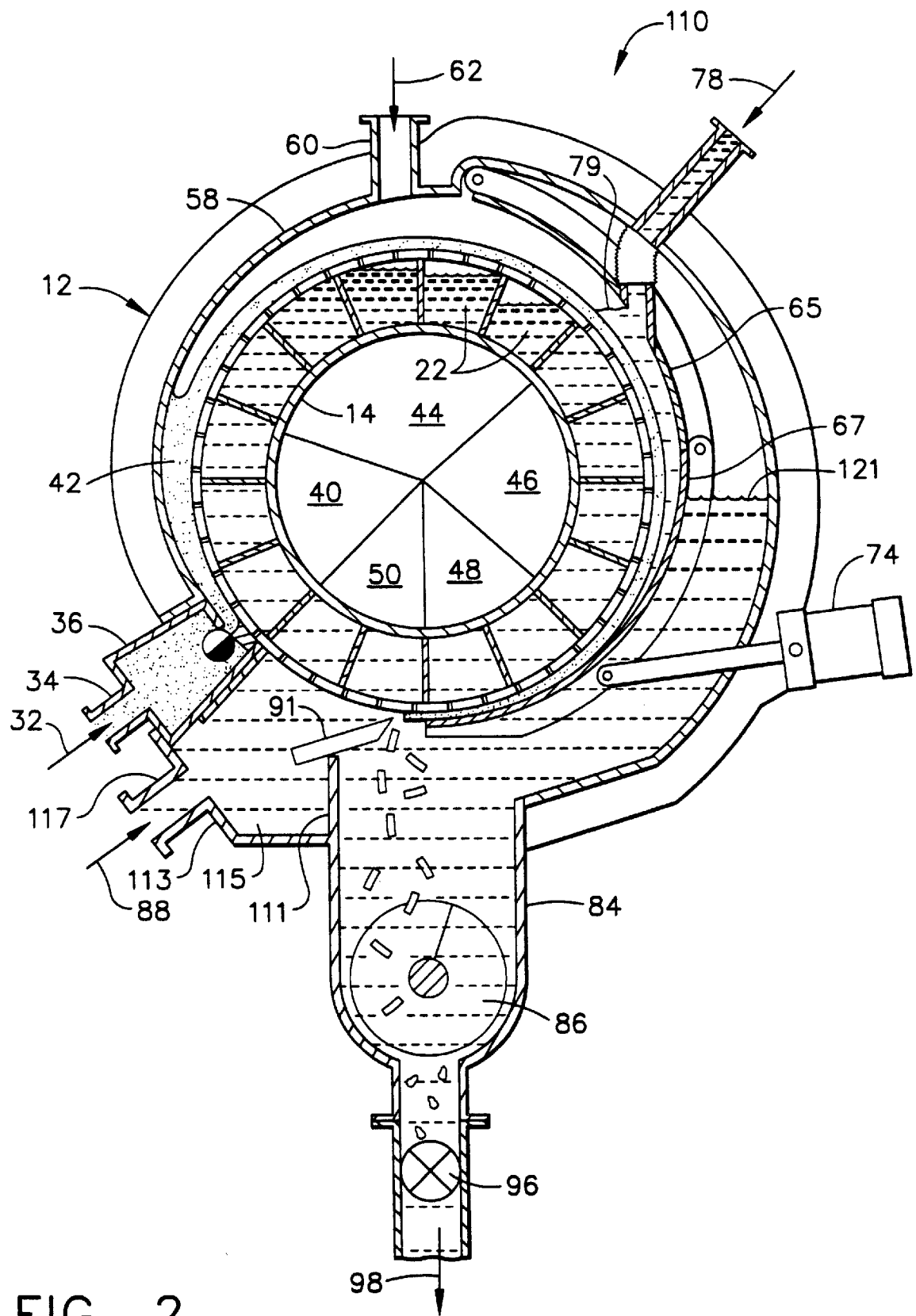
FIG. 2 illustrates a single roll displacement wash press according to a second embodiment of the present invention.

FIG. 2 illustrates a single roll displacement wash press 110 according to a second embodiment of the present invention. Wash press 110 is identical to wash press 10, with the following exceptions. Wash press 110 includes a seal 111 which has one end attached to outlet chute 84 and an opposite end disposed in sealing engagement with the doctor blade 91. The crumb sluice box 104 of wash press 10 is replaced by a member 113 which extends between the outlet chute 84 and the pulp slurry inlet box 36. Seal 111 and member 113 combine with the doctor blade 91 to form a chamber 115 radially outward of drum 14 within the face-cleaning and take-off zone 50. Spray manifold 106 of wash press 10 is eliminated and dilution inlet 90 of wash press 10, which communicates with outlet chute 84, is replaced by a dilution liquid inlet 117 which is attached to member 113 and communicates with the face-cleaning and take-off zone 50. The seal 111 which extends between doctor blade 91 and the outlet chute 84 forces the dilution liquid 88, supplied to inlet 117, through the clearance between the tip of the doctor blade 91 and the outer surface 26 of the outer wall 16 of drum 14, with this clearance being increased relative to that of wash press 10. The injection of liquid 88 between the tip of the doctor blade 91 and drum 14 facilitates removal of the mat 42 from drum 14. The dilution liquid 88 fills the outlet chute 84 and the chamber created between housing 12 and the radially outer surface 67 of the circumferentially and longitudinally extending portion 65 of baffle 64 over an arc length corresponding to the compaction zone 48 and at least a portion of the displacement zone 46, as indicated by level 121 of the liquid 88. The level 121 of liquid 88 is controlled to the desired level by control valve 96. Due to the hydraulic pressure of the dilution liquid 88 exerted on the radially outer surface 67 of portion 65 of baffle 64, reduced force is required to maintain baffle 64 in the operating position. Accordingly, piston 74 may have a reduced size, as compared to that required for use with wash press 10. Additionally, since outlet chute 84 is flooded with the dilution liquid 88 air is not entrained in the pulp discharging from outlet chute 84, which enhances the pulp for use in downstream processes. It is noted that wash press 110 may also operate in the mode where the extraction zone 44 is eliminated, due to relatively high pulp and wash liquid production feed rates, as discussed previously with respect to wash press 10.

In operation, both wash press 10 and wash press 110 receive a flow of pulp 32 having a consistency ranging from about 2% o.d. to about 6% o.d. In each of the wash presses 10 and 110, a pulp mat 42 is formed on the outer surface of drum 14, with the pulp mat 42 being exposed in succession to the formation zone 40, the extraction zone 44, the displacement zone 46 and the compaction zone 48, as drum 14 rotates about centerline axis 30. Presses 10 and 110 are effective for displacing the undesirable contaminates from the pulp mat 42, and increasing the consistency of the pulp within mat 42, as mat 42 travels through each of the foregoing zones. The use of the divergent formation zone 40, followed immediately by the extraction zone 44 where the contaminated liquor is gently forced out of the pulp mat 42 by the action of the pressurized gas 62 within zone 44 avoids the problem of pulp mat disruption experienced by prior wash presses utilizing convergent formation zones followed immediately by wash zones. The homogeneity and terminal consistency of the pulp within the pulp mat 42 discharging from the extraction zone 44 provides ideal conditions for efficient displacement washing within the displacement zone 46. In the instances where the extraction zone 44 is eliminated from wash presses 10 and 110 due to relatively high pulp and wash liquid feed rates, disruption of the pulp mat 42 is minimized since the interface between the formation zone 40 and the displacement zone 46 occurs within an upper portion of housing 12 during operation in this mode. Furthermore, operation in this mode eliminates air entrainment which may otherwise be introduced when the pulp mat 42 passes through the extraction zone 44. Wash presses 10 and 110 provide a wide range of pulp discharge consistencies and provide effective means for purging any pulp fiber plugs which may accumulate since baffle 64 may be retracted to the pulp-plug-purging position 76 and no other converging areas exist within the presses. Wash press 1 10 provides the additional advantages of reduced piston force required to load baffle 64 relative to that required of wash press 10, avoidance of induced air entrainment in the pulp within the outlet chute 84, and elimination of the crumb sluice box 104.

While the foregoing description has set forth the preferred embodiments of the present invention in particular detail, it must be understood that numerous modifications, substitutions and changes can be undertaken without departing from the true spirit and scope of the present invention as defined by the ensuing claims. The invention is therefore not limited to specific preferred embodiments as described, but is only limited as defined by the following claims.

What is claimed is:

1. A method for increasing a consistency of pulp using a single roll displacement wash press having a housing and a drum rotatably mounted within the housing, the press further including in circumferential succession, a formation zone, an extraction zone, and a displacement zone, said method comprising the steps of:

supplying a pulp having a consistency ranging from about 2% o.d. to about 6% o.d. to the formation zone of the single roll displacement wash press;

forming a mat of the pulp on a generally cylindrical outer surface of the drum within the formation zone of the press, the formation zone comprising an upstream end and a downstream end, the formation zone being divergent between the upstream end and the downstream end;

supplying a gas to the extraction zone so as to pressurize the extraction zone and gently force contaminated liquor out of the pulp mat so as to increase the consistency of the pulp within the extraction zone;

washing the pulp mat within the displacement zone of the press;

removing the pulp mat from the drum.

2. The method of claim 1 wherein the supplying step further comprises increasing the consistency of the pulp within said extraction zone to about 15% o.d.

3. The method of claim 1 wherein the washing step further comprises flooding said displacement zone with a wash liquid which is effective for displacing contaminated liquor from said pulp mat.

4. The method of claim 1 wherein the removing step further comprises removing at least a substantial portion of the pulp mat from said drum with a doctor means and dropping the pulp mat into an outlet chute of said housing after being removed from said drum by said doctor means.

5. The method of claim 4 further comprising the step of extracting the pulp mat from said outlet chute of said housing with a helical screw rotatably mounted within said outlet chute.

6. The method of claim 4 further comprising the step of forcing a dilution liquid between said doctor means and said drum so as to facilitate removal of the pulp mat from said drum and for flooding said outlet chute so as to minimize air entrainment within the pulp.

7. A method for increasing a consistency of pulp using a single roll displacement wash press having a housing and a drum rotatably mounted within the housing, the press further including in circumferential succession, a formation zone, an extraction zone, and a displacement zone, said method comprising the steps of:

supplying a pulp having a consistency ranging from about 2% o.d. to about 6% o.d. to the formation zone of the single roll displacement wash press;

forming a mat of the pulp on a generally cylindrical outer surface of the drum within the formation zone of the press, the formation zone comprising an upstream end and a downstream end, the formation zone being divergent between the upstream end and the downstream end;

extracting contaminated liquor out of the pulp mat in the extraction zone so as to increase the consistency of the pulp within the extraction zone;

washing the pulp mat within the displacement zone of the press;

removing the pulp mat from the drum.

8. The method of claim 7 wherein the extracting step further comprises supplying a gas to the extraction zone to gently force contaminated liquor out of the pulp mat.

9. The method of claim 7 wherein the supplying step further comprises increasing the consistency of the pulp within said extraction zone to about 15% o.d.

10. The method of claim 7 wherein the washing step further comprises flooding said displacement zone with a wash liquid which is effective for displacing contaminated liquor from said pulp mat.

11. The method of claim 7 wherein the removing step further comprises removing at least a substantial portion of the pulp mat from said drum with a doctor means and dropping the pulp mat into an outlet chute of said housing after being removed from said drum by said doctor means.

12. The method of claim 11 further comprising the step of extracting the pulp mat from said outlet chute of said housing with a helical screw rotatably mounted within said outlet chute.

13. The method of claim 11 further comprising the step of forcing a dilution liquid between said doctor means and said drum so as to facilitate removal of the pulp mat from said drum and for flooding said outlet chute so as to minimize air entrainment within the pulp.

* * * * *

UNITED STATES PATENT AND TRADEMARK OFFICE
CERTIFICATE OF CORRECTION

PATENT NO. : 5,872,242
DATED : February 16, 1999
INVENTOR(S) : Monia, et al.

Page 1 of 2

It is certified that error appears in the above-indentified patent and that said Letters Patent is hereby corrected as shown below:

At col 14, line 16, in Table 4, please delete "CCACACCGACGGCGCCC" and insert therefor --CCACACCGACGGCGCCC--.

At col 15, line 48, please delete "2'-Omethly" and insert therefor --2'-O-methyl--.

At col 16, line 33, please delete "dosedependent" and insert therefor --dose-dependent--.

At col 17, line 13, in Table 7, OLIGO # 4233, please delete "CsCsAsCsAsCoCoGoAoCoGsGsCsGsCsCsC" and insert therefor --CsCsAsCsAsCoCoGoAoCoGsGsCsGsCsCsC--.

At col 17, line 39, please delete "ISIS 422G" and insert therefor --ISIS 4226--.

At col 21, line 9, please delete ""o"" and insert therefor --"$_o$"--.

At col 21, line 9, please delete ""s"" and insert therefor --"$_s$"--.

UNITED STATES PATENT AND TRADEMARK OFFICE
CERTIFICATE OF CORRECTION

PATENT NO. : 5,872,242
DATED : February 16, 1999
INVENTOR(S) : Monia, et al.

It is certified that error appears in the above-indentified patent and that said Letters Patent is hereby corrected as shown below:

At col 25, line 27, please delete "methoxvethyl" and insert therefor --methoxyethyl--.

At col 26, line 24, please delete "oligonucleotide" and insert therefor --Oligonucleotide--

At col 29, line 57, please delete "CDNA" and insert therefor --cDNA--.

At col 30, line 32, please delete "2(amino)" and insert therefor --2-(amino)--.

At col 32, line 11, please delete "200" and insert therefor 200--

Signed and Sealed this

Tenth Day of August, 1999

Attest:

Q. TODD DICKINSON

*Attesting Officer*   *Acting Commissioner of Patents and Trademarks*

UNITED STATES PATENT AND TRADEMARK OFFICE
CERTIFICATE OF CORRECTION

PATENT NO. : 5,842,242
DATED : December 1, 1998
INVENTOR(S) : John S. Antkowiak

It is certified that error appears in the above-indentified patent and that said Letters Patent is hereby corrected as shown below:

Column 8, line 51 - "80" should read --91--.

Signed and Sealed this

Seventeenth Day of August, 1999

Attest:

Q. TODD DICKINSON

*Attesting Officer*  *Acting Commissioner of Patents and Trademarks*